United States Patent [19]

Hishikawa et al.

[11] Patent Number: 4,526,483
[45] Date of Patent: Jul. 2, 1985

[54] FLUID FOIL BEARING

[75] Inventors: Yasuo Hishikawa, Kyoto; Hisashi Mitani, Osaka; Masanao Ando, Kyoto, all of Japan

[73] Assignee: Shimadzu Corporation, Kyoto, Japan

[21] Appl. No.: 619,640

[22] Filed: Jun. 14, 1984

Related U.S. Application Data

[63] Continuation of Ser. No. 390,374, Jun. 21, 1982.

[30] Foreign Application Priority Data

Jun. 29, 1981 [JP] Japan .................................. 56-101960
Jun. 29, 1981 [JP] Japan .................................. 56-101961
Jun. 29, 1981 [JP] Japan .................................. 56-101962

[51] Int. Cl.$^3$ ............................................. F16C 32/06
[52] U.S. Cl. ...................................... 384/106; 384/103
[58] Field of Search ............... 384/106, 105, 104, 103, 384/100, 99

[56] References Cited

U.S. PATENT DOCUMENTS

| | | | |
|---|---|---|---|
| 3,635,534 | 1/1972 | Barnett | 384/106 |
| 3,893,733 | 7/1975 | Silver et al. | 384/106 |
| 4,153,315 | 5/1979 | Silver et al. | 384/106 |
| 4,208,076 | 6/1980 | Gray et al. | 384/105 |
| 4,223,958 | 9/1980 | Gray | 384/99 |
| 4,300,806 | 11/1981 | Heshmat | 384/103 |

Primary Examiner—Stuart S. Levy
Assistant Examiner—Thomas R. Hannon
Attorney, Agent, or Firm—Fidelman, Wolffe & Waldron

[57] ABSTRACT

A fluid foil bearing comprises a bearing housing in which the journal of a rotatable shaft is positioned, a single foil bearing is so arranged in the housing as to surround substantially the whole circumference of the shaft journal with a minute space interposed between the foil bearing and the shaft journal, and supporting under foils are disposed outside the foil bearing and inside the housing for resiliently supporting the foil bearing at circumferentially spaced intervals so as to provide a predetermined preload on the shaft.

5 Claims, 10 Drawing Figures

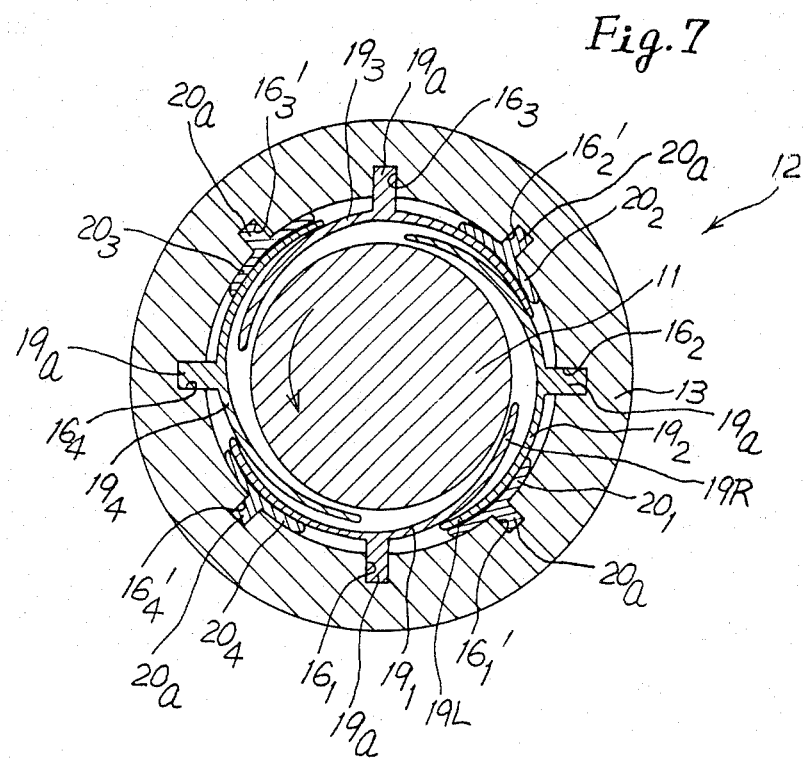
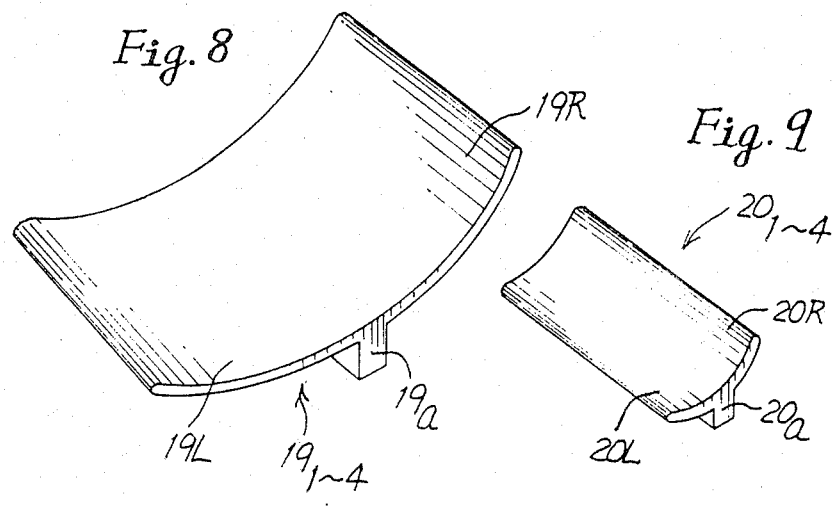

FLUID FOIL BEARING

This application is a continuation of application Ser. No. 390,374, filed June 21, 1982.

BACKGROUND OF THE INVENTION

This invention relates to a fluid foil bearing of the journal or radial type.

One known fluid foil bearing of this type comprises a plurality of thin resilient metal sheets or foils so arranged in the bearing housing as to surround a rotatable element or shaft to be supported by the bearing, so that as the shaft is rotated, a dynamic pressure of the fluid developed in the wedge-shaped spaces formed between the opposed surfaces of the foils and the shaft provides a bearing effect for the shaft floating in the fluid between the foils and the shaft. Since this bearing is of a non-contact type, it is substantially free from overheating, enables rotation of the shaft at a higher speed than otherwise and is suitable for use in various pneumatic machines such as turbines.

The provision of many separate foils within a narrow space between the inner circumferential surface of the bearing housing and the outer circumferential surface of the rotatable shaft, however, makes the structure of the bearing complex and bulky, and it is also difficult with the prior art arrangement to adjust the stiffnesss or spring constant of the foils.

If the foils are so arranged that they partially overlap each other, it is less likely that wedge-shaped spaces are formed between the outer circumferential surface of the shaft and the opposed surfaces of the foils, and it becomes difficult to adjust the pressure with which the foils contact the shaft, that is, the preload exerted on the shaft by the foils, so that bearings of different characteristics and capacities must be provided to provide different amounts of preload.

Accordingly, it is a general object of the invention to provide an improved fluid foil bearing which is free from the above-mentioned and other disadvantages of the prior art arrangements.

Another object of the invention is to provide an improved fluid foil bearing which is easy in adjustment of preloading of the shaft.

Another object of the invention is to provide an improved fluid foil bearing which is simple in construction, and reliable and accurate in operation.

The invention will be described in detail with reference to the accompanying drawings.

BRIEF DESCRIPTION OF THE DRAWINGS

FIG. 3 is a perspective view of the bearing foil used in the bearing of FIGS. 2 and 2a;

FIG. 4 is a perspective view of one of the under foils used in the bearing of FIGS. 2 and 2a;

FIG. 7 is a transverse sectional view of a third embodiment of the invention;

FIG. 8 is a perspective view of one of the bearing elements used in the bearing of FIG. 7; and FIG. 9 is a perspective view of one of the supporting elements used in the bearing of FIG. 7.

SUMMARY OF THE INVENTION

The invention provides a fluid foil bearing which comprises a bearing housing and a single sheet of resilient foil disposed in the housing to function as a bearing element for a rotatable element such as the shaft of a turbine. The bearing foil which will also be referred to as the upper foil is anchored along one side edge thereof to the interior surface of the bearing housing by means of an anchoring pin fitted into a corresponding slot or channel formed in the interior surface of the bearing housing.

The bearing foil extends from the anchoring pin so as to surround substantially the whole outer circumferential surface of the shaft, with a plurality of resilient supporting elements or under foils disposed between the outer circumferential surface of the single bearing foil and the interior surface of the bearing housing to resiliently support the bearing foil at circumferentially spaced intervals thereby to provide an appropriate preload on the shaft. The arrangement enables easy adjustment of preloading.

As the shaft is rotated, a dynamic pressure developed in the wedge-shaped spaces formed between the shaft and the bearing foil provides an efficient fluid bearing effect for the rotating shaft.

The invention provides another fluid foil bearing which comprises a bearing housing and a plurality of resilient bearing foils so arranged in the housing as to surround a rotatable shaft. The bearing foils are so dimensioned that they do not overlap each other, and are cantilevered at one side edge thereof to the interior surface of the housing at circumferentially spaced intervals, with a resilient supporting element or under foil underlying each of the upper bearing foils to resiliently support the bearing foil adjacent the middle portion thereof thereby to provide an appropriate amount of preload on the shaft.

Each of the under foils is also cantilevered to the interior surface of the bearing housing immediately adjacent the position where the corresponding upper bearing foil is anchored. The arrangement simplifies the structure of the bearing and enables easy adjustment of preloading of the shaft.

The invention provides a third fluid foil bearing which comprises a bearing housing and a plurality of bearing elements so arranged in the housing as to surround a rotatable shaft. The bearing elements are generally T-shaped in cross section and comprises a relatively short central leg and a pair of wings made of resilient foil and extending from the leg in opposite directions circumferentially of the shaft.

The bearing elements are anchored at the central leg thereof to the interior surface of the bearing housing at circumferentially spaced intervals, with the opposite wings of each of the bearing elements partially overlapping the adjacent wings of the adjacent bearing elements. The overlapping wing portions are resiliently supported by a supporting element so that a predetermined preload is imposed on the shaft.

DESCRIPTION OF PREFERRED EMBODIMENTS

Figure 1:
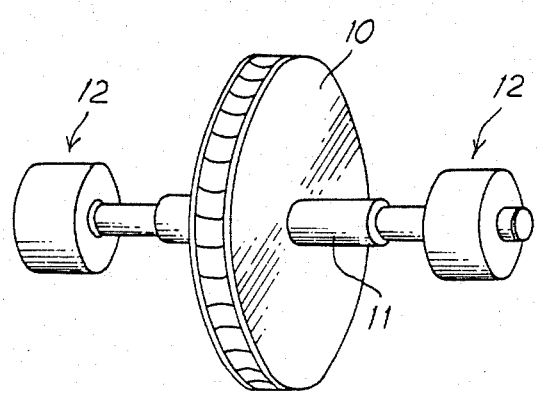
FIG. 1 is a schematic perspective view of a pneumatic machine in which the fluid foil bearing of the invention may be used.

Referring now to the drawings wherein the same reference numerals or symbols in different figures designate corresponding parts or elements, there is shown in FIG. 1 a turbine rotor 10 fixedly carried by a rotatable shaft 11 having opposite journals supported by a pair of fluid foil bearings 12. The two bearings are of the same construction, so that only one of them will be explained.

Figure 2A:
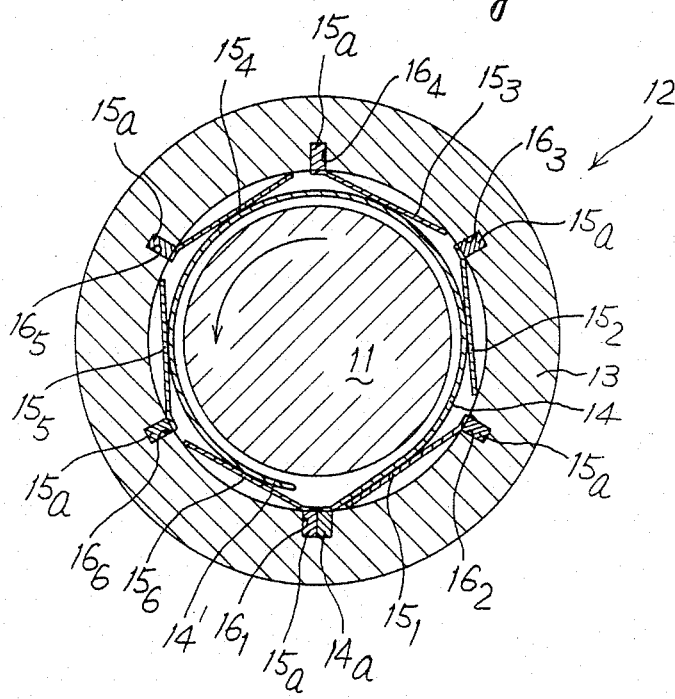
FIG. 2a is a view similar to FIG. 2 but showing a modified form of the bearing.
Figure 2:
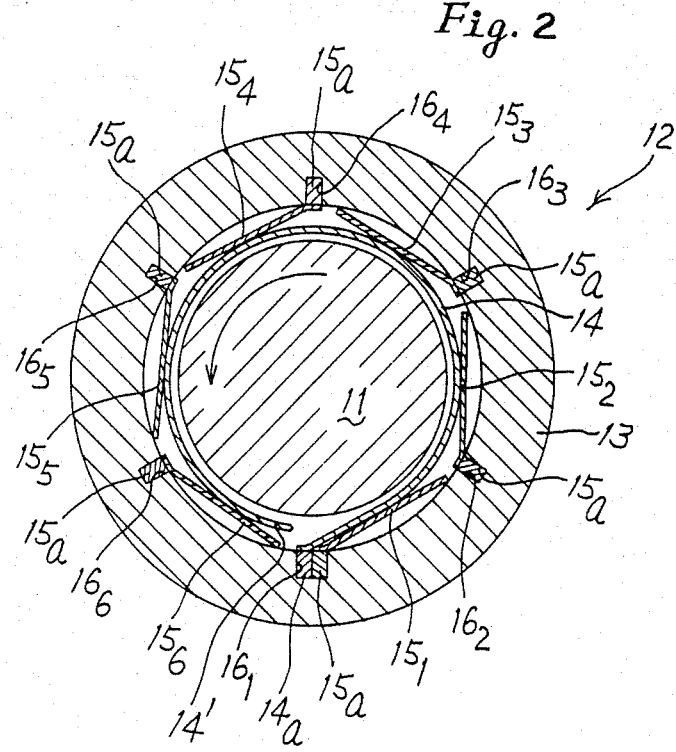
FIG. 2 is a transverse sectional view of one embodiment of the invention.
Figure 3:
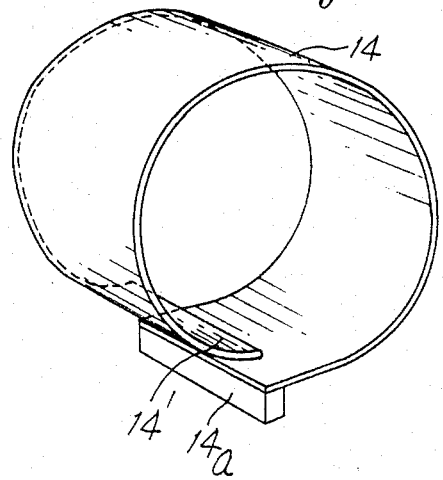
Figure 4:
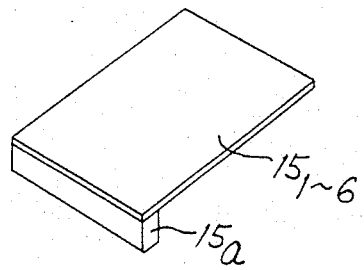

FIG. 2 shows the interior mechanism of the bearing 12 in transverse cross section, with the shaft 11 shown in the state of rotation.

The bearing 12 comprises a bearing housing 13, a single bearing foil 14 and six supporting foils $15_1$ to $15_6$. The bearing foil 14 will be referred to also as the upper foil and the supporting foils $15_1$ to $15_6$, as the under foils. Since the six under foils are of the same structure, they will be designated by 15 without the suffix when no discrimination is needed.

The bearing housing 13 is mounted on a suitable fixed member or frame of the pneumatic machine, not shown.

The bearing foil 14 and the supporting foils 15 may be of any suitable material such as stainless steel having a suitable resiliency and a sufficient resistance to wear which would occur in fluid foil bearing operation. The bearing foil 14 has an elongated rectangular shape of a suitable size. An anchoring pin 14a of rectangular cross section is fixed to one side edge of the bearing foil 14 in any suitable known manner such as spot welding.

The bearing housing 13 is formed in the interior surface thereof with six slots or channels $16_1$–$16_6$ extending a predetermined length in a direction parallel to the axis of the housing 13 and arranged at 60° spaced intervals circumferentially thereof. The channel $16_1$ is of a width greater than that of the other channels $16_2$–$16_6$.

The anchoring pin 14a of the bearing foil 14 is fitted into the channel $16_1$ and extends therefrom counterclockwise in FIG. 2 substantially the whole circumference of the shaft 11 as far as it terminates in a free end 14' above and adjacent the anchoring pin 14a. The width of the bearing foil 14 longitudinal of the shaft 11 depends on the axial length of the journal of the shaft.

It should be noted that the illustrated relative dimensions of the parts or elements as well as those of the gaps or spaces in the figures do not represent the actual dimensions. In particular, the thickness of the foils and the distance of the gap or space between the foil or foils and the shaft or the interior surface of the housing are shown exaggerated only for simplicity and clarity of illustration.

The under foils $15_1$ to $15_6$ are of a rectangular or square shape having a shorter length than the upper foil 14 in the circumferential direction of the shaft 11, and each of the under foils has its one edge fixed to an anchoring pin 15a similar to the anchoring pin 14a of the bearing foil 14. The under foils $15_1$ to $15_6$ are arranged around the upper bearing foil 14, with the anchoring pins 15a being detachably fitted into the corresponding channels $16_1$ to $16_6$, so that the under foils resiliently support the upper foil 14 at six positions spaced 60° apart from each other circumferentially of the upper foil or the shaft, thereby causing the upper foil to contact the shaft with a suitable contact pressure or preload.

Although in the illustrated embodiment of FIG. 2 the anchoring pin 15a of the under foil $15_1$ is fitted into the same channel $16_1$ into which the anchoring pin 14a of the upper foil 14 is fitted, the two pins 14a and 15a may be fitted into separate channels.

In FIG. 2 the under foils $15_1$ to $15_6$ are so arranged in the bearing housing 13 that they extend from their respective anchoring pins 15a counterclockwise, that is, in the same direction as that of rotation of the shaft 11. The arrangement may also be such that the under foils extend from the anchoring pin clockwise, that is, in the direction opposite to that of rotation of the shaft as shown in FIG. 2a, wherein the same reference numerals as in FIG. 2 designate corresponding parts so that no further explanation will be needed.

As the shaft 11 is rotated counterclockwise as indicated by an arrow in FIG. 2 or 2a, the shaft is in contact with the bearing foil 14 due to the preload caused by the under foils $15_1$ to $15_6$ until a predetermined rotational speed e.g. 1000 r.p.m. is reached, whereupon a dynamic pressure is produced in the six wedge-shaped spaces not shown but formed between the outer circumferential surface of the shaft 11 and the opposed inner circumferential surface of the bearing foil 14 to cause the shaft to float within the space defined by the bearing foil, so that the shaft can be rotated at a higher speed of e.g. 100,000 r.p.m.

While the shaft is being rotated at a high speed, if an abnormal condition occurs to displace the shaft, the bearing and supporting foils are displaced and/or deformed so that the bearing space between the shaft and the bearing foil is kept constant thereby to keep the bearing function stable and steady.

The preload on the shaft provided by the under foils is determined depending upon the masses of the shaft and the rotor of the turbine and the amount of load to be carried by the turbine. The preload can be adjusted or changed by changing the number of the under foils provided (e.g. by providing five instead of six under foils with one under foil having been removed) or by changing the dimensions and/or material of the under foils thereby to change the stiffness or spring constant thereof.

Since there is provided only a single bearing foil, the number of the component parts of the bearing is reduced, so that the whole structure of the bearing is simplified and made compact. The bearing foil 14 may have a desired thickness within a predetermined range, and the thickness need not be determined with a high degree of accuracy, with resulting easiness in making the foil. When the shaft 11 is displaced during rotation for one cause or another, the resilient under foils 15 allow the upper bearing foil 14 to be displaced and/or deformed to ensure a stable bearing function. Even when foreign bodies happen to be introduced into the bearing space, the dynamic pressure will not be reduced but kept substantially unchanged so that a stable bearing function is maintained.

By selecting the design of the under foils it is easily possible to provide a fluid foil bearing suitable for a particular application. Since considerable tolerances are allowed in the design and dimensions of the foils, the fluid foil bearing of the invention is suitable for mass production. the bearing is free from thermal strain and suitable for high speed operation and can endure long use and improve the performance of the pneumatic machines in which the bearing is used.

Figure 5:
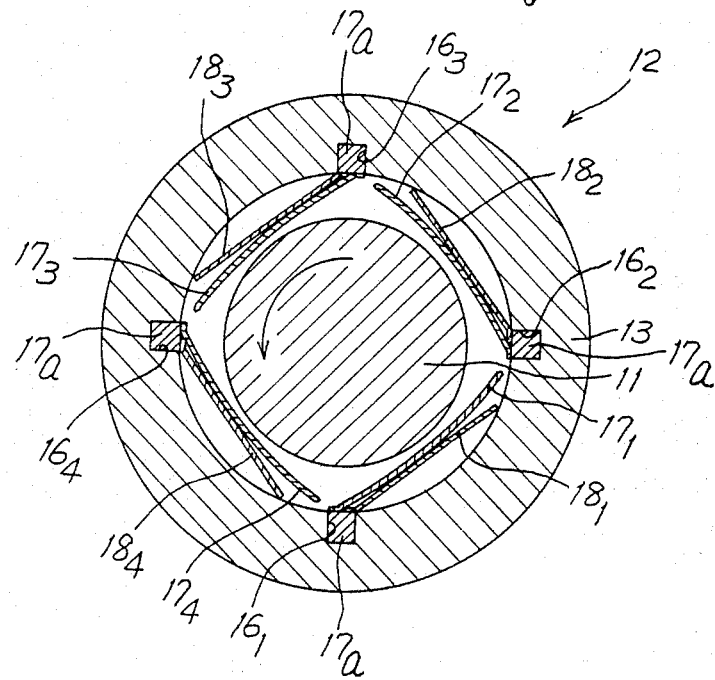
FIG. 5 is a transverse sectional view of another embodiment of the invention.
Figure 6:
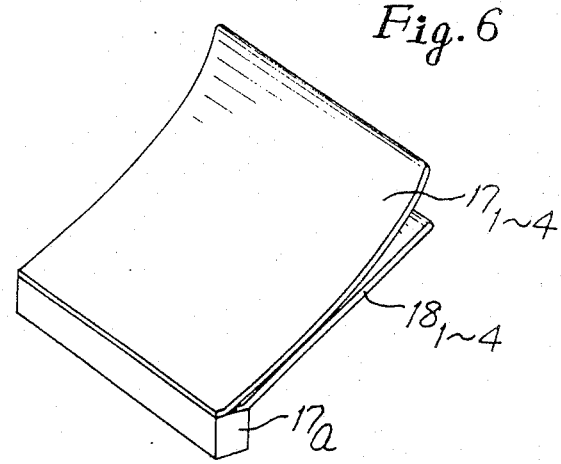
FIG. 6 is a perspective view of one of the bearing foils used in the bearing of FIG. 5, with an under foil supporting the bearing foil.

FIGS. 5 and 6 show another embodiment of the invention, wherein there are provided four upper bearing foils $17_1$ to $17_4$ and four corresponding under supporting foils $18_1$ to $18_4$ each paired with one of the bearing foils.

Each of the upper foils $17_1$ to $17_4$ is cantilevered at one side edge thereof to an anchoring pin $17a$, to which the under foil paired with the upper foil is cantilevered at the corresponding one side edge thereof. The anchoring pins $17a$ of the four pairs of upper and under foils are detachably fitted respectively into four slots or channels $16_1$ to $16_4$ formed in the interior surface of the bearing housing 13 at 90° spaced intervals circumferentially thereof, so that the upper foils surround the shaft 11, with the under foils resiliently supporting the upper foils adjacent the middle portion thereof and causing them to contact the shaft with a certain pressure or preload.

The upper foils $17_1$ to $17_4$ are of such shape and size that they do not overlap each other. The length of the upper foils in the direction of rotation of the shaft depends on the number of foils provided. In the illustrated embodiment, since there are provided four foils, their length approximates the length of one side of a square circumscribing the shaft 11. The length of the under foils is a little smaller than that of the upper foils.

The width of the upper and under foils longitudinal of the shaft 11 depends upon the axial length of the journal of the shaft.

The magnitude of preload provided by the under foils is determined by the resiliency of the foils and can be adjusted or changed by changing the number of the pairs of upper and under foils provided and/or the size, shape or material of the foils.

As the shaft is rotated at above a predetermined speed, the dynamic pressure developed in the four wedge-shaped spaces formed between the outer circumferential surface of the shaft and the four bearing foils provides a fluid bearing for the shaft to enable stable high speed rotation of the shaft. Any displacement of the rotating shaft may be compensated by such deformation or displacement of the foils as to keep constant the bearing space between the shaft and the bearing foils.

Since the upper bearing foils do not overlap each other but are supported by individual under supporting foils, it is easy to adjust the preload imposed on the shaft by changing the size, shape and material of the under foils. The arrangment of the piled upper and under foils combined with a common anchoring pin makes the structure of the bearing simple and compact and suitable for high speed bearing operation.

Turning now to FIGS. 7 to 9 which show a third embodiment of the invention, there are shown four bearing elements $19_1$ to $19_4$ which are generally T-shaped in cross section and comprise a relatively short central leg $19a$ and a pair of wings 19L and 19R made of resilient foil and extending from the leg $19a$ laterally in opposite directions and being upwardly curved. In the interior surface of the bearing housing there are formed four slots or channels $16_1$ to $16_4$ spaced 90° apart from each other, into which the four bearing elements $19_1$ to $19_4$ have their respective central legs $19a$ detachably fitted, so that the bearing elements surround the shaft.

The wings of each of the bearing elements are of such a length that when the bearing elements are arranged about the shaft in the above-mentioned manner, the adjacent wings of the adjacent bearing elements partially overlap each other. The manner of overlapping of the adjacent foil wings depends upon the direction of rotation of the shaft 11. In FIG. 7, since the shaft 11 is rotated counterclockwise, the left-hand wing 19L of each bearing element 19 underlies or lies outside the right-hand wing 19R of the adjacent bearing element on the left-hand or clockwise side, while the right-hand wing 19R of the element overlies or lies inside the left-hand wing 19L of the adjacent bearing element on the right-hand or counterclockwise side. The length of the overlapping portions of the adjacent wings is determined in consideration of the size and position of the supporting elements to be described below.

To impose a preload on the shaft, there are provided four resilient supporting elements $20_1$ to $20_4$ which are of T-shaped cross section similar to but smaller than the bearing elements $19_1$ to $19_4$ and comprise a central leg $20a$ and a pair of wings 20R and 20L made of resilient foil and extending from the leg $20a$ laterally in the opposite directions and being slightly upwardly curved.

In the interior surface of the bearing housing 13 there are provided four more slots or channels $16_1'$ to $16_4'$ spaced 90° apart from each other and 45° apart from the previously mentioned channels $16_1$ to $16_4$ for the bearing elements $19_1$ to $19_4$.

The supporting elements $20_1$ to $20_4$ have their respective central legs $20a$ fitted into the channels $16_1'$ to $16_4'$ so that the foil wings of the supporting elements 20 resiliently support the overlapping portions of the foil wings of the adjacent bearing elements 19 thereby to cause a predetermined preload to be imposed on the shaft 11.

The magnitude of preload on the shaft, that is, the pressure with which the foil wings of the bearing elements 19 contact the shaft depends upon the resiliency of the foil wings of the supporting elements 20 and can be adjusted or changed by changing the number of the bearing elements provided or by changing the size, shape and/or material of the foil wings of the supporting elements.

As the shaft 11 is rotated at a speed higher than a predetermined speed, a dynamic pressure generated in the wedge-shaped spaces between the shaft and the bearing elements provides a fluid bearing effect for the shaft in a manner similar to that in the previous embodiments.

In the embodiments of FIGS. 7 to 9, although the opposite foil wings of the bearing elements are of a different length, they may be of the same length. Although the leg and the wings are of the same material and formed as an integral body, the wings may be different parts which may be combined with the leg into a single body by means of welding.

Each of the supporting elements may be divided along the width thereof or along the axis of the shaft into a plurality of component parts of the same T-shaped cross section.

The arrangement of FIGS. 7 to 9 enables easy adjustment of the preload on the shaft and improves the performance of the bearing and makes the bearing suitable for high speed operation. Since considerable tolerances are allowed in the design and dimension of the foils, the bearing is suitable for mass production.

What we claim is:

1. A fluid foil bearing comprising a housing in which a portion of a rotatable shaft is positioned, a foil bearing comprising a single sheet of resilient foil encircling said shaft portion and an anchoring pin fixed to one side edge of said foil for anchoring said foil to the interior surface of said housing and arranged in said housing as to surround substantially the whole circumference of said shaft portion with a minute space interposed between said foil bearing and said shaft portion, and supporting means disposed outside said foil bearing and in said housing for resiliently supporting said bearing at circumferentially spaced intervals so as to provide a predetermined preload on said shaft, wherein said supporting means comprises a plurality of generally flat, planar resilient foils arranged around said single bearing foil and each having one side edge secured to said housing interior surface at circumferentially spaced intervals and an opposite free edge contacting said housing interior surface to be supported thereby at a position spaced from said one side edge, with an intermediate portion of each said generally flat, planar foil extending between said opposite two edges and spaced apart from said housing interior surface for generally tangential contact with said single bearing foil at circumferentially spaced intervals with a predetermined contact pressure, thereby to provide a predetermined preload on said shaft.

2. The fluid foil bearing of claim 1, wherein said housing is formed in the interior surface thereof with a plurality of channels extending axially thereof and circumferentially spaced at predetermined intervals, and each of said supporting foils is provided on one side edge thereof with an anchoring pin detachably fitted into one of said channels, and said anchoring pin of said single bearing foil is detachably fitted into one of said channels together with the anchoring pin of one of said supporting foils.

3. The fluid foil bearing as in claim 2, wherein an unanchored edge of said foil bearing points generally in the direction of rotation of said shaft.

4. The fluid foil bearing as in claim 3, wherein said supporting means resilient foils have free ends pointing generally in the direction of said unanchored edge.

5. The fluid foil bearing as in claim 3, wherein said resilient foils have free ends pointing generally in a direction opposite of said unanchored edge.

* * * * *